US005486866A

United States Patent [19]
Helfrich et al.

[11] Patent Number: 5,486,866
[45] Date of Patent: Jan. 23, 1996

[54] OSCILLATOR FREE RUN FREQUENCY SETTING BY DATA BUS CONTROL

[75] Inventors: Kenneth J. Helfrich; Joseph C. Stephens, both of Fishers; Kevin E. McClain; Brian Lee, both of Indianapolis, all of Ind.

[73] Assignee: Thomson Consumer Electronics, Inc., Indianapolis, Ind.

[21] Appl. No.: 264,132

[22] Filed: Jun. 21, 1994

[51] Int. Cl.$^6$ ............................................. H04N 5/04
[52] U.S. Cl. .................... 348/500; 348/521; 348/536; 348/735
[58] Field of Search ............................ 348/189, 190, 348/178, 521, 500, 536, 537, 735, 725; 358/139, 10, 148, 158, 188, 195.1; H04N 17/00, 5/06, 5/04, 5/50

[56] References Cited

U.S. PATENT DOCUMENTS

| 4,575,761 | 3/1986 | Carlson | 348/735 |
| 4,817,195 | 3/1989 | Kubo | 348/735 |

*Primary Examiner*—James J. Groody
*Assistant Examiner*—Sherrie Hsia
*Attorney, Agent, or Firm*—Joseph S. Tripoli; Joseph J. Laks; Francis A. Davenport

[57] ABSTRACT

A free running frequency alignment method in a video display having a sync generator comprising a first oscillator having a first frequency and a second oscillator having a second frequency. The first oscillator is phase modulated by the second oscillator which has a free running frequency different from a standard frequency. The free running frequency of the first oscillator is to be controllably aligned to the standard frequency by a method comprising the steps of applying a frequency determining initial control value to the first oscillator and measuring an average free running frequency responsive to the initial control value. An absolute difference frequency is calculated between the average frequency and the standard frequency. The absolute difference frequency is tested for a frequency value less than a predetermined value which signifies an aligned condition. If the difference frequency is less than the predetermined value the alignment is complete. If the difference frequency is greater than the predetermined value the alignment is continued and a new control value is generated responsive to the difference. The new control value is applied to the first oscillator and the steps of average frequency measurement, absolute difference frequency calculation and difference frequency value testing are repeated until alignment is achieved. Upon failure of the difference frequency test, a counter is incremented and the count examined to determine if a predetermined number of alignment attempts have been exceeded. Upon exceeding the predetermined number the alignment is determined to have failed and the alignment is ended.

20 Claims, 8 Drawing Sheets

5,486,866

OSCILLATOR FREE RUN FREQUENCY SETTING BY DATA BUS CONTROL

This invention relates to a video display, and in particular to adjustment of a free running frequency of a sync pulse generator.

BACKGROUND OF THE INVENTION

An existing NTSC television receiver is controlled by a microcomputer which communicates with various receiver subsystems via a data bus. The receiver design may include a multi function integrated circuit which provides most of the sub-subsystems required in an NTSC TV receiver. To facilitate the display signals other than those conforming to the NTSC synchronizing standard may involve the use of a multi-standard sync generator. The multi-standard sync generator may be interfaced to the existing IC sub-subsystems for signal extraction, and signal reinsertion. However, cost and device availability may preclude the use of additional bus controllable multi-standard integrated circuits. Furthermore, to minimize additional manufacturing costs resulting from such a multi-standard requirement, the design should utilize the same test fixtures and retain the same automated, computer controlled set up and alignment capability employed for the basic single standard chassis.

An existing multifunction integrated circuit sync generator is designed for NTSC synchronizing standard operation and as such, without an input sync signal, the sync generator defaults to nominal NTSC sync parameters. Under the same no signal conditions a multi-standard sync generator defaults to nominal sync parameters of, for example, a 625 line 50 Hz standard. The cost/design constrains result in an inevitable interconnection between the two sync generation systems which coexist satisfactorily when externally synchronized. However, with no input sync signal, the two sync generator default standards are substantially different, resulting in spurious signal generation and difficulty in determining and setting the free running frequency of the NTSC only generator.

SUMMARY OF THE INVENTION

A method for free running frequency alignment of a first oscillator in a video display having a sync generator. The sync generator comprises the first oscillator having a first frequency and a second oscillator having a second frequency. The first oscillator is phase modulated by the second oscillator which has a free running frequency different from a standard frequency. The free running frequency of the first oscillator is to be controllably aligned to the standard frequency by a method comprising the steps of applying a frequency determining initial control value to the first oscillator and measuring an average free running frequency responsive to the initial control value. An absolute difference frequency is calculated between the average frequency and the standard frequency and a new control value is generated responsive to the difference. The new control value is applied to the first oscillator for alignment with the standard frequency.

DETAILED DESCRIPTION

Figure 1:
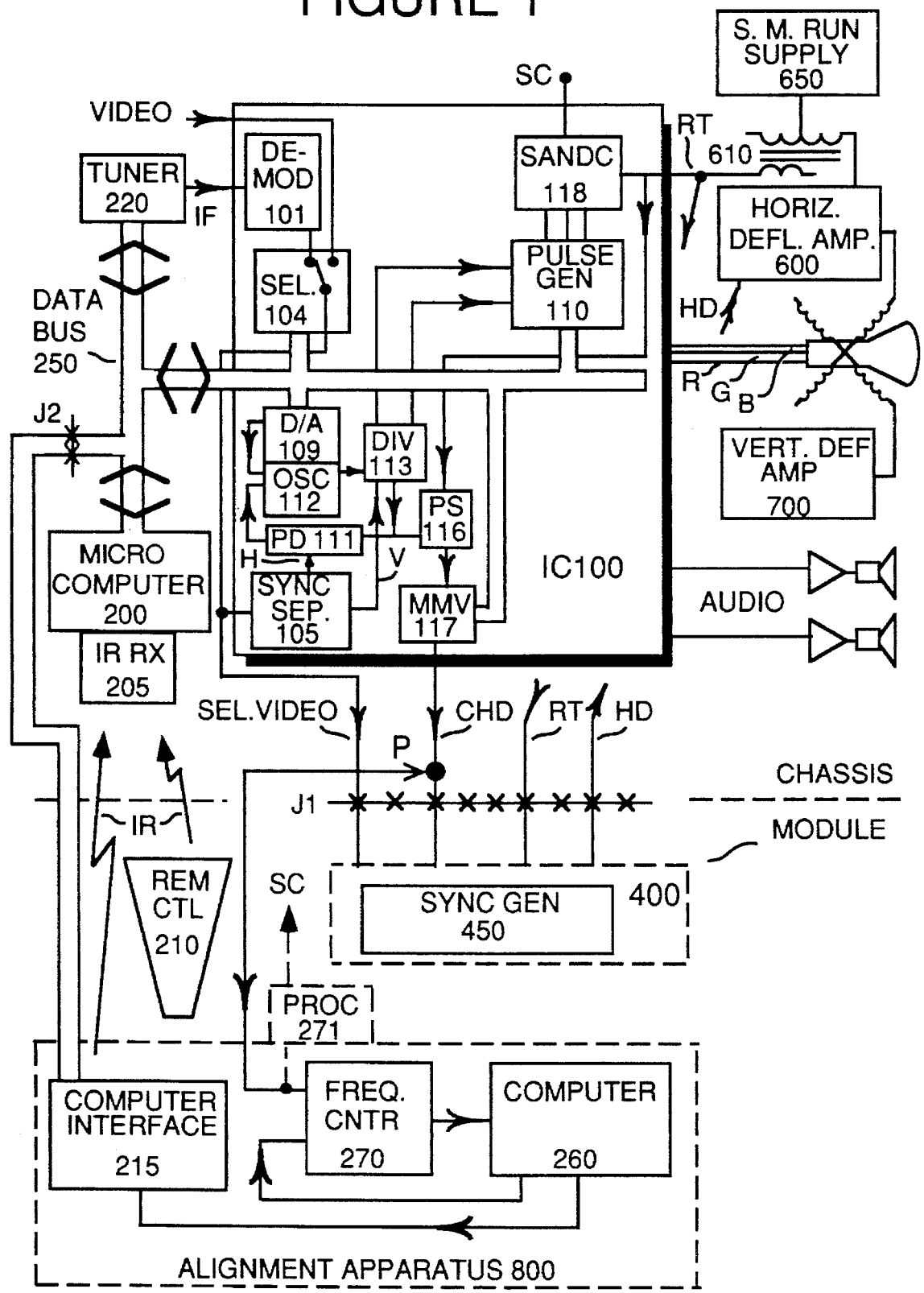
FIG. 1 shows a simplified block diagram of a multi standard TV receiver incorporating an inventive setup arrangement.

FIG. 1 is a block diagram of a TV receiver employing a microcomputer 200, for set up and control of most receiver subsystems. Microcomputer 200 receives and transmits data from a bidirectional data bus 250. In addition control data is received by infra red receiver 205, from a user remote control receiver 210, and during manufacturing test and alignment, from a computer interface 215. Thus virtually all the receiver setup and user operational controls are provided via microcomputer 200 and bidirectional data bus 250. The data bus is connected to an RF tuner 220, and to a multi function NTSC TV receiver integrated circuit IC 100. Integrated circuit 100 provides the following receiver subsystems, IF amplification, video demodulation 101, video source selection 104, chrominance demodulation and decoding, audio demodulation, sync separation 105 and pulse and waveform generation (110–118) etc. In FIG. 1, IC 100 depicts some of the multiple circuit functions provided therein. Data bus 250 is shown for illustrative purposes, extended within IC 100 to indicate specific circuit functions controlled by data from the microcomputer 200.

Integrated circuit 100 contains a switch 104 which permits selection of video for display. Video source selection is made by a command transmitted from remote control unit 210 to the microcomputer 200 and then via the data bus 250 to IC 100. The video source may originate in the form of a base band video signal or may be received by the RF tuner 220, and input as an IF signal for demodulation by demodulator 101. The selected video source is connected to a sync separator 105 which separates the synchronizing pulses from the selected video signal. The separated horizontal and vertical sync are coupled to pulse generator 110. The horizontal sync signal is also used as an input to phase detector 111 which controls an oscillator 112. The oscillator signal is counted down by divider 113 to generate a horizontal rate signal which is coupled to phase detector 111 for phase comparison. The horizontal rate signal is also coupled to a second phase control loop which generates the controlled horizontal drive signal CHD. A phase shifter 116, controls the horizontal phase of a horizontal rate signal responsive to retrace pulses RT from the horizontal deflection output transformer 610. Thus delay in the deflection amplifier and coil may be compensated for in the generation of the controlled horizontal drive signal generated by MMV 117. Prior to multi-standard modification the controlled horizontal drive signal was connected to a horizontal deflection amplifier 600, and switch mode run power supply 650 via transformer 610. Similarly, prior to modification, a vertical deflection signal was generated and coupled to a vertical deflection amplifier 700.

Various other correction signals and pulse waveforms are produced from signals generated by the locked oscillator 112 and pulse generator 110. A sandcastle pulse signal is produced by generator 118 which sums horizontal and vertical rate blanking signals together with a burst gate pulse. Since the blanking signals are required to blank the displayed image they are derived from deflection related signals. However, the burst gate pulse is required to gate out the color burst for processing prior to display, hence it must be derived from a horizontal rate signal which is not phase controlled by the horizontal retrace pulse. Thus a horizontal rate signal from the first horizontal oscillator control loop is used to generate the burst gate pulse.

Divider 113 and pulse generator 110, of IC 100, are synchronized by sync separated from the selected video coupled from switch 104 of IC 100. However, divider 113 and pulse generator 110 function by the count down method, based on divisors appropriate to the NTSC standard only. Thus deflection generation in multiple synchronizing standards is provided by a second, synchronizable multi-standard sync generator 450 of module 400. However, oscillator 112 and pulse generator 110, of IC100, continue to be synchronized and provide various timing and pulse signals which are not specifically standard related. Module 400 is coupled to the receiver chassis by a connector J1 which intercepts various signals generated by IC 100. Similarly multi-standard synchronizing signals from sync generator 450, are returned to the main chassis via connector J1. A detailed description of sync generator 450 is given with reference to FIGS. 2 and 3.

Microcomputer 200 receives and transmits data from the bidirectional data bus 250, and in addition control data is received by an infra red or IR receiver 205 from a user remote control unit 210. The IR input capability of Microcomputer 200 is also utilized in addition to direct data bus connection at connector J2, for coupling setup data from computer 260. IR transmission coupling is provided by computer interface 215, and is utilized during final test and setup when the receiver is complete with the back attached. FIG. 1 illustrates an alignment apparatus 800, which may be used for setting the free running frequency of oscillator 112. The oscillator frequency is measured and set to a nominal center frequency via a control loop comprising frequency counter 270, computer 260, computer interface 215, connector J2, data bus 250, digital to analog converter 109 and oscillator 112. The frequency of oscillator 112 is monitored at the output of monostable multivibrator 117. The monitor point is depicted by probe P which is connected to the frequency counter 270. The free running frequency of oscillator 112 is set to a frequency of 32 times the NTSC horizontal frequency responsive to a 5 bit data word. The value of the 5 bit data word is set by computer 260, and is coupled via data bus 250. The frequency setting 5 bit word is decoded from the data bus and converted by a digital to analog converter 109 into an analog frequency control signal having 32 possible values. The analog output of D/A converter 109 is coupled to oscillator 112 and determines the free running frequency. During normal synchronized operation a second control signal from phase detector 111 provides control to synchronize oscillator 112 to the frequency of the selected video input.

Figure 2:
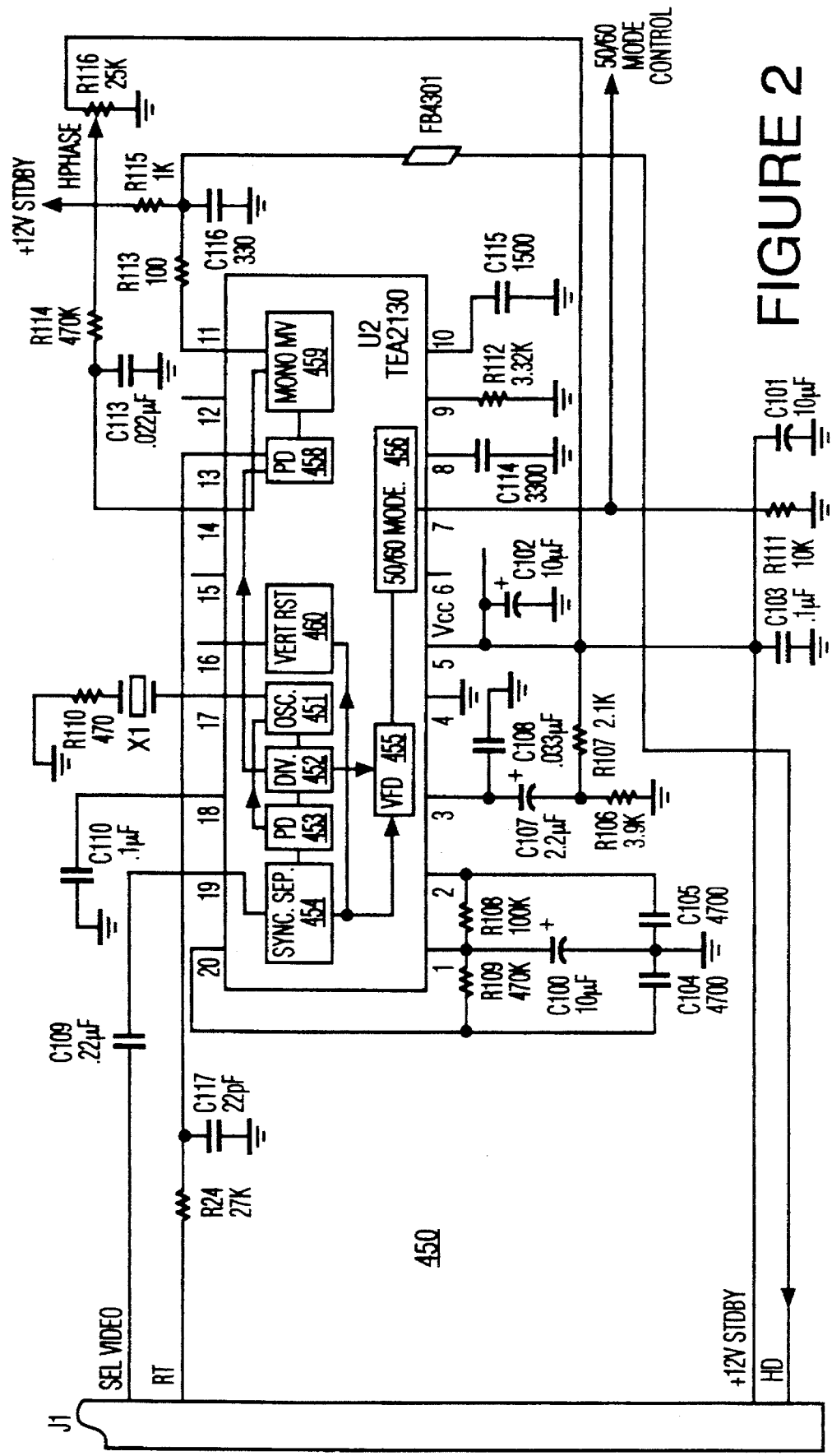
FIG. 2 is an electronic schematic drawing showing a multistandard sync generator circuit.

A synchronizable multi-standard sync generator U2, is shown in FIG. 2, for example IC type TEA 2130. Selected video from switch 102, of IC 100, is coupled via connector J1 to a capacitor C109 which is connected to pin 19 of sync generator IC U2. The video signal is coupled to sync separator 454, of IC U2, for sync separation. The horizontal sync separator employs a slicing method where sync pulses are detected at a 50% sync amplitude value determined by a capacitor C110, connected between pin 18 and ground. The separated horizontal rate pulses are coupled to a phase detector 453 which comprises a first control loop to synchronize the frequency of a voltage controlled oscillator 451. Oscillator 451 employs a ceramic resonator X1 which oscillates at 32 times the horizontal frequency, approximately 500 KHz. The oscillator signal and is counted down by divider 452, to produce synchronizing signals appropriate to various synchronizing standards. The output from phase detector 453 is coupled to a low pass filter comprising a capacitor C108 coupled from IC U2 pin 3 to ground and a second capacitor C107 connected from pin 3 to a positive DC potential developed at the junction of a resistive divider formed by resistors R106 and R107. Horizontal retrace pulses RT, from horizontal output transformer 610 of horizontal deflection amplifier 600, are coupled via connector J1 to a high frequency roll off filter formed by a series resistor R24 and a shunt connected capacitor C117. The filtered retrace pulses are applied to pin 13 of IC U2 to provide a horizontal phase reference for a second detector 458. The phase detector 458, is coupled to a monostable multivibrator 459, which generates a horizontal drive signal HD, that is output at pin 11 of U2. An internally generated reference voltage of 1.3 volts is output at pin 9 and coupled to ground via a resistor R112. The reference voltage is coupled to monostable multivibrator 459, which has a timing capacitor C115 connected between pin 10 and ground. The horizontal drive signal HD, is phase locked to the retrace pulse RT and may be adjusted in horizontal phase by a potentiometer R116. The wiper of potentiometer R116 is coupled via a low pass filter formed by a series resistor R114 and a shunt connected capacitor C113 and applied to pin 14 of U2. Potentiometer R116 develops a positive DC potential which is added to the PLL output signal for coupling to monostable multivibrator 459. Multivibrator 459 generates horizontal drive signal HD, which is coupled via a series connected resistor R113 to the junction of a resistor R115 and a high frequency roll off capacitor C116. The junction of capacitor C116 and resistor R115 is connected via connector J1 to deflection amplifier 600 on the main chassis.

Figure 3:
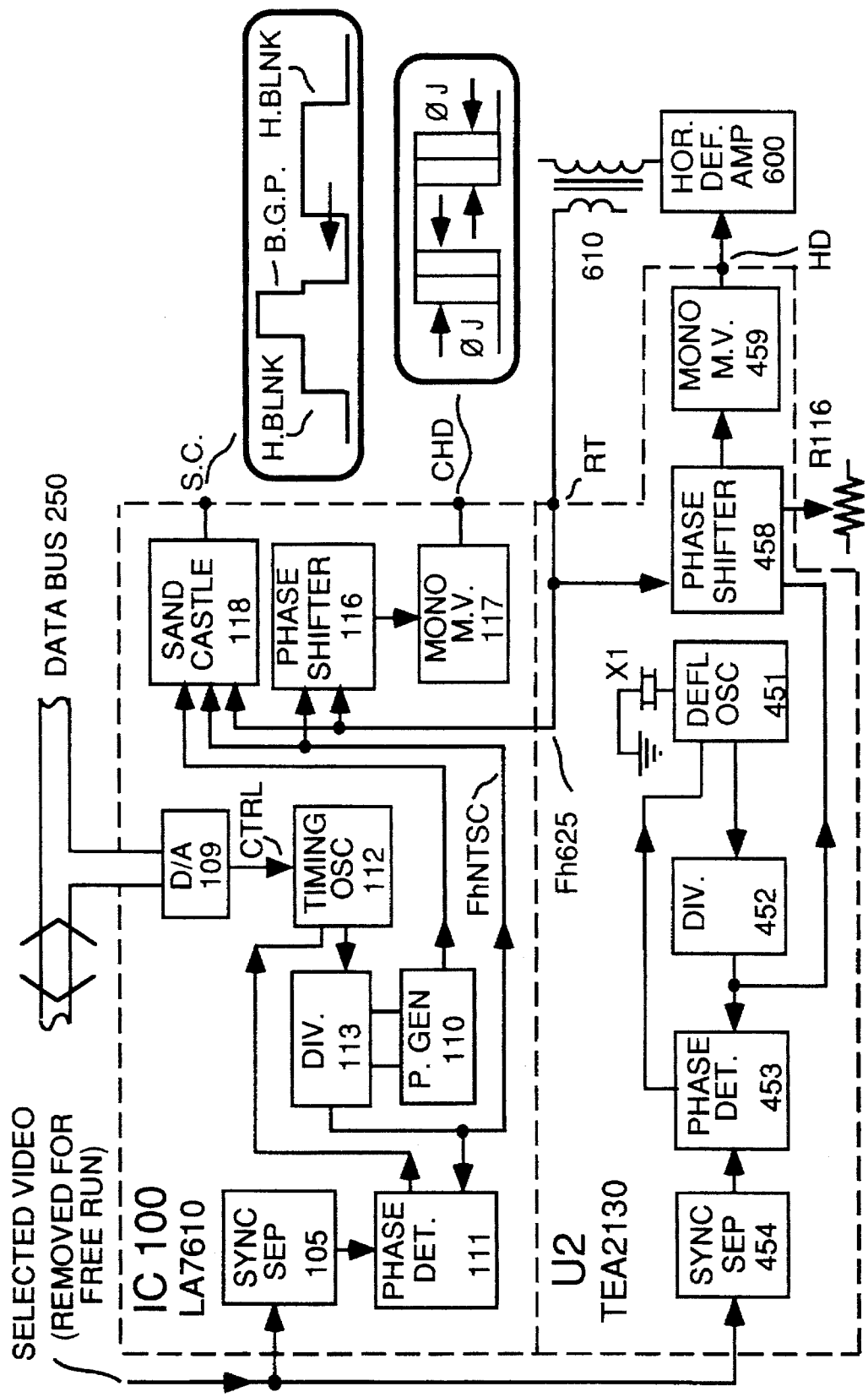
FIG. 3 is a simplified block diagram showing an interconnection between sync generators of FIG. 2.

FIG. 3 is a simplified block diagram depicting the free running operation of the oscillators and horizontal sync systems of IC 100 and integrated circuit U2. With multistandard operation, the oscillators and horizontal rate systems of the two integrated circuits have different uses. For example, oscillator 112, divider 113 and pulse generator 110 generate various timing pulse signals which are not standards specific and thus are utilized in all operating standards. The oscillator 451 and divider 452 of U2 are capable of standard specific operation and are thus used to generate deflection drive signals.

In IC 100 the selected video signal is coupled to sync separator 105 and the horizontal pulse output is applied as a reference to the phase detector 111. The second input of phase detector 111 is coupled to divider 113 which divides an output signal from timing oscillator 112 by 32. Oscillator 112 operates at frequency of 32 times horizontal rate thus division by 32 which yields a horizontal frequency signal for frequency locking via phase detector 111. When the selected video signal is disconnected oscillator 112 free runs and under this condition the free running frequency is set to a frequency of 32 times the NTSC horizontal frequency. A data word comprising 5 bits is decoded from data bus 250 and converted by a digital to analog converter 109 into a current CTRL, which determines the free running frequency of timing oscillator 112.

The divided oscillator signal is also coupled to a second phase control loop comprising phase shifter 116 which is referenced to the horizontal retrace pulse RT from horizontal output transformer 610. The output of phase shifter 116 is applied to monostable multivibrator 117 which generates the horizontal drive signal CHD. The CHD signal depicted in FIG. 3 is shown during the free run condition when subject to spurious phase jitters ØJ. The horizontal drive signal CHD is used for measurement during frequency setting but is not utilized to drive horizontal deflection amplifier 600. A sandcastle pulse generator 118, produces a conventional signal which includes signals indicting both horizontal and vertical blanking intervals together with a burst gating pulse. The horizontal blanking pulse is derived from retrace pulse RT, and is coupled to pulse generator 118. During non-synchronized operation, oscillator 451 free runs resulting in the horizontal deflection amplifier 600 and the retrace pulse having a nominally 625 line horizontal frequency. The burst gate component of the sandcastle pulse is generated by a horizontal rate signal from divider 113 and is thus not subjected to perturbation by oscillator 451 driving phase shifter 116. The sandcastle pulse is shown in FIG. 3. During the free run condition the burst gate pulse is generated by oscillator 112 and has a nominally 525 line horizontal frequency. If the burst gate pulse in FIG. 3, is considered to be stationary, the horizontal blanking component will have and interfering component which will move past the burst gate signal, as depicted by the arrows, as a consequence of the 625 line frequency retrace signal.

The sync separator 454 of multi-standard sync generator U2 is coupled to the same selected video source as IC 100. Separated horizontal pulses are coupled to phase detector 453 as a frequency reference for deflection oscillator 451. The second input of phase detector 453 is coupled to divider 452 which divides the output signal of oscillator 451 by 32. Since deflection oscillator 451 operates at 32 times horizontal frequency the output from divider 453 is a horizontal rate signal. The output from the phase detector 453 is fed back to control the frequency the oscillator. The oscillator has a free running frequency determined by a ceramic resonator X1 which has a frequency of 500 KHz and is not adjustable. The divided oscillator signal is coupled to a second control loop formed by phase shifter 458, monostable multivibrator 459 and the horizontal deflection amplifier 600 and output transformer 610. Retrace pulses RT from the output transformer are coupled as a reference signal to phase shifter 458 where the phase of the divided oscillator signal is controlled. The output pulse from the phase shifter and a DC horizontal phase control voltage from potentiometer R116, are applied to monostable multivibrator 459 which generates an appropriately phased horizontal drive signal HD, for coupling to the main chassis for deflection and power supply generation.

With the selected video signal coupled to both sync generators both oscillators are frequency locked and generally function in synchronism. However, to permit adjustment of oscillator 112, free run frequency requires that the synchronizing signal be disconnected or the selected video signal be interrupted to allow the oscillator to free run. Without synchronization the two sync generators default to their basic synchronizing standards, which for IC 100 is 525 lines 60 Hz, and 625 lines 50 Hz for IC U2. Retrace pulse RT is coupled to both sync generators but is generated responsive to sync generator U2 and thus free runs at approximately 15,625 Hz. Thus in IC 100, a nominal NTSC horizontal frequency signal FhNTSC 15,734 Hz, is phase shifted continuously by phase shifter 116 responsive to a nominal 625 line horizontal frequency of 15,625 Hz generated by U2. Phase shifter 116 has a control range of a few micro seconds which may for example, represent 10% of the horizontal duration. Thus during most of the horizontal period the phase shifter is driven between the extremities of the phase control range at a rate determined by the difference between the two free running frequencies. Hence the monostable multivibrator 117 output CHD, depicted in FIG. 3, will exhibit spurious and quasi random phase modulation ØJ, which may occur at a rate in the order of a few kilohertz.

Figure 4:
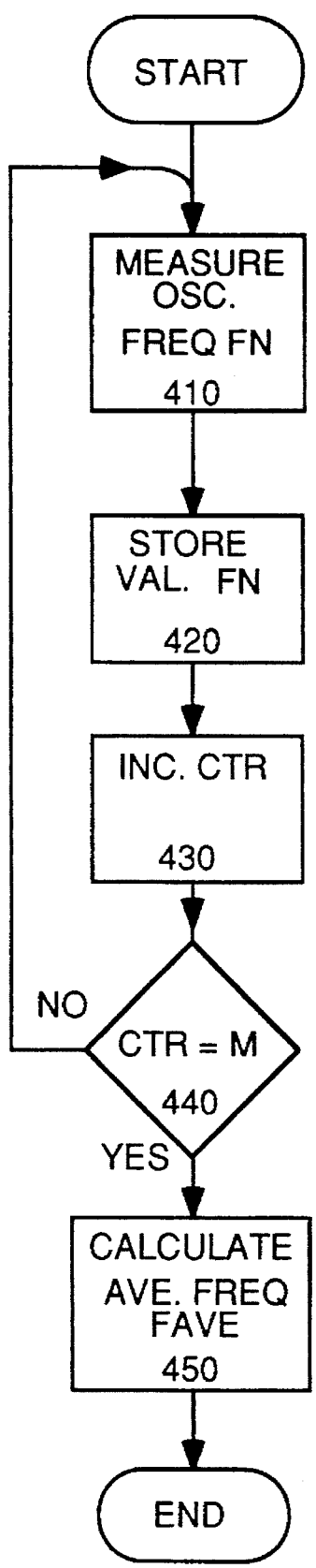
FIG. 4 shows a flow chart for an inventive algorithm for average frequency measurement by the apparatus of FIG. 1.

The free running frequency alignment of timing oscillator 112 is performed by alignment apparatus 800 as described earlier. In order to utilize the same alignment fixtures for both single standard and mulitstandard receivers, the automated adjustment of oscillator 112 is performed by measurement of horizontal drive signal CHD, which represents the oscillator frequency divided by 32. However, signal CHD is spuriously phase modulated by the retrace pulse derived from oscillator 451. Thus an averaging algorithm shown in FIG. 4 is employed to determine an average frequency of the perturbed signal. A further algorithm, shown in FIGS. 5 and 6 is employed to calculate a control signal value required to change the free run frequency to align with a specific frequency.

Figure 7:
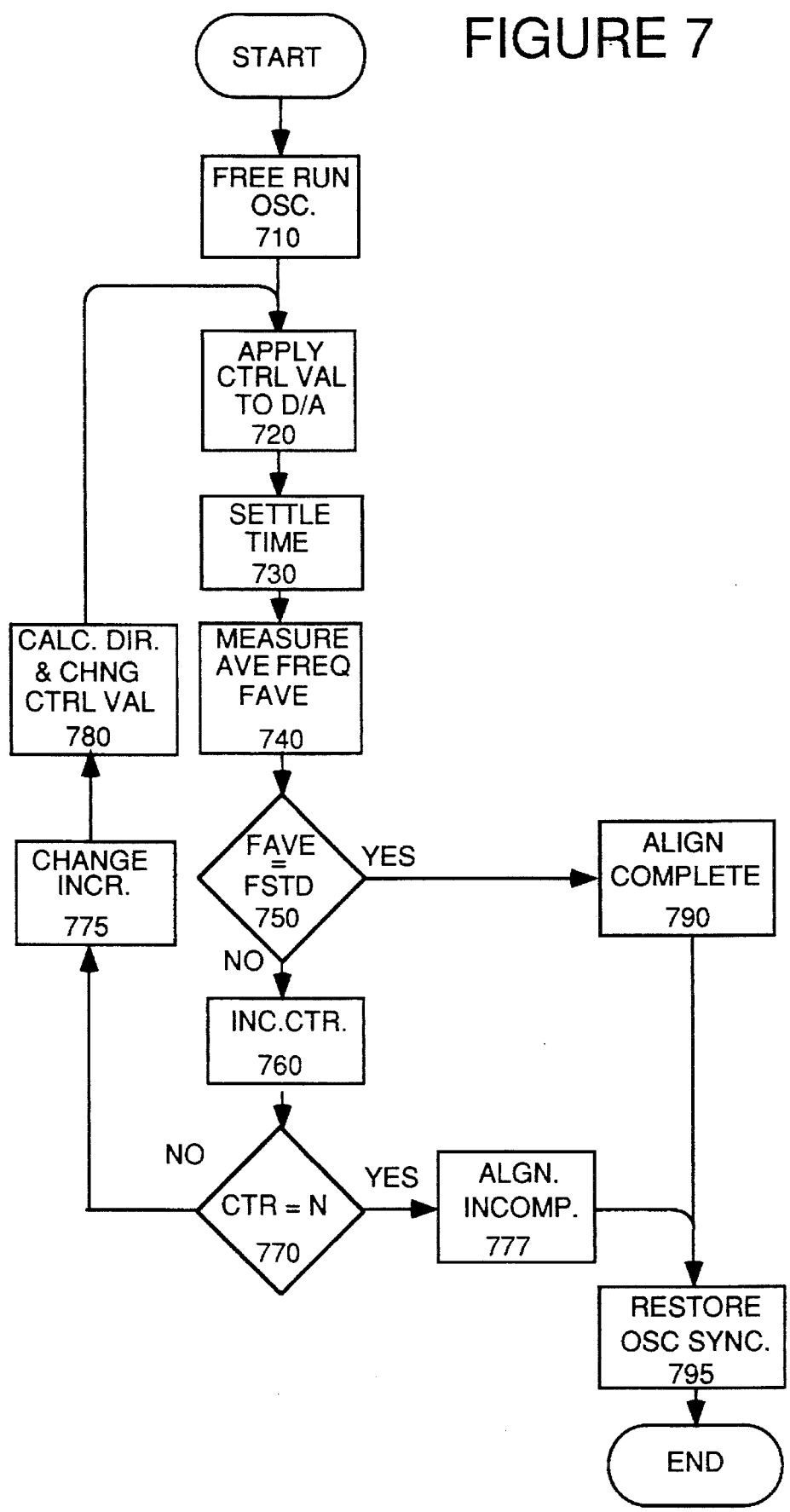
FIG. 7 shows a flow chart of a further inventive setup algorithm of FIG. 1.
Figure 8:
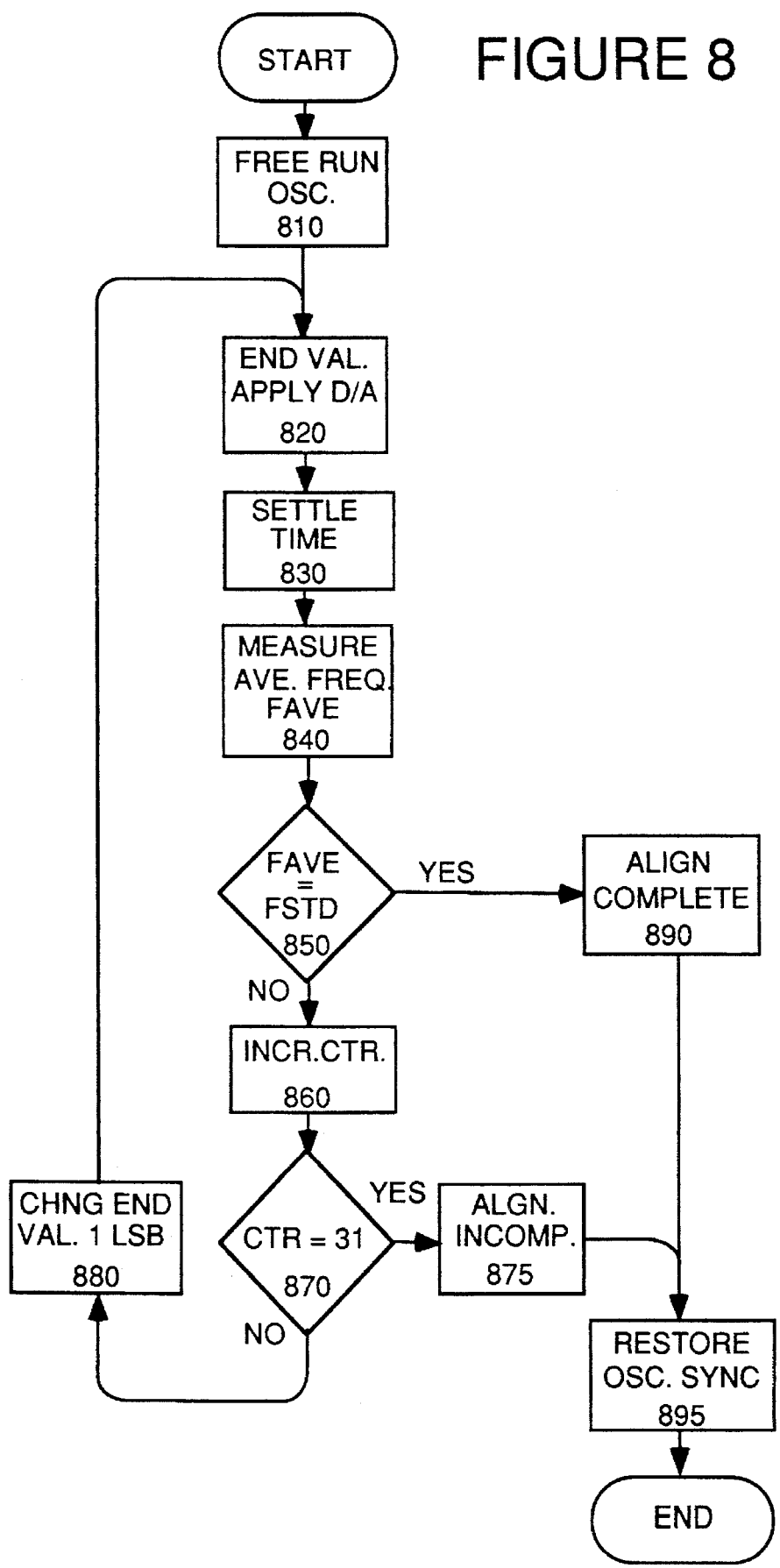
FIG. 8 shows a flow chart of another inventive setup algorithm of FIG. 1.

As described earlier, the sandcastle pulse formed by generator 118 of IC 100 includes a burst gate pulse. The burst gate pulse is derived from a horizontal rate signal which is not subject to phase modulation by phase shifter 116 and thus, is directly indicative of the frequency of oscillator 112. However, measurement of the sandcastle burst gate pulse requires modification of the alignment fixture to probe generator 118 output SC. In addition signal processing circuitry 271 is required to extract or separate the burst gate pulse component from the interfering blanking signal components. Advantageous alignment algorithms for free run frequency alignment using burst gate pulse measurement are shown in FIGS. 7 and 8.

The flow chart of FIG. 4 shows an advantageous averaging algorithm for determining an average frequency of the controlled horizontal drive signal CHD which is subject to random phase modulation by retrace pulses RT. The averaging algorithm is initiated at the element marked START and at element 410, the frequency FN of the CHD signal is measured. The frequency value is stored in memory at element 420. The measurement is averaged over a number of repetitions determined by a counter which is incremented at element 430. The counter value is tested at element 440, for equality with a predetermined integer M, for example M= 512. If the test result is NO, elements 410–440 are repeated until equality is reached. Equality or YES at element 440, results in a calculation of an average frequency FAVE at element 450. The average frequency is calculated by summing the stored values of FN and dividing the summation value by the number of values stored, for example M. The measurement and calculation of average frequency FAVE requires approximately 33 milliseconds. Having calculated the average frequency FAVE the algorithm ends at element END.

Figure 5:
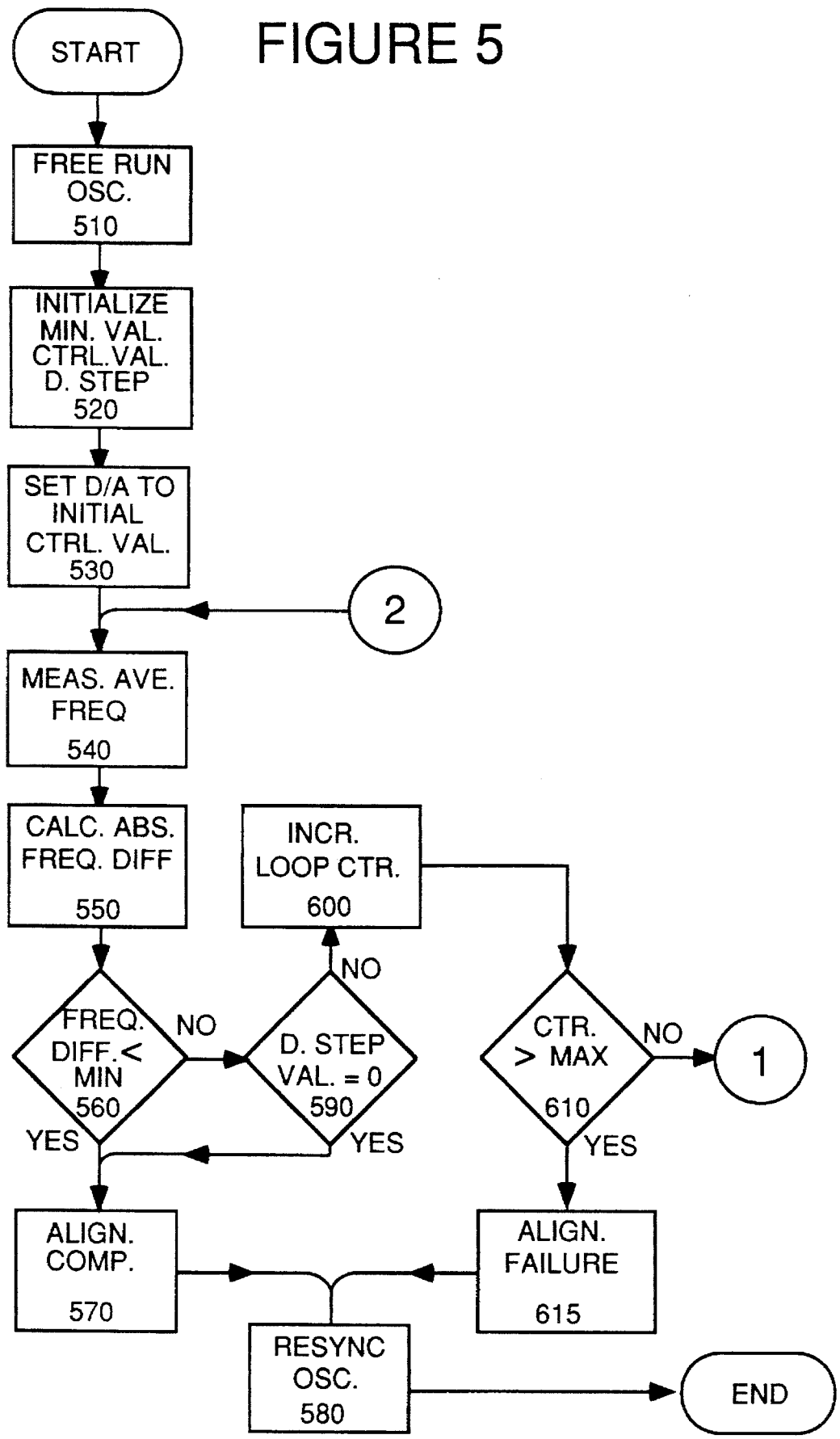
FIG. 5 and 6 show a detailed flow chart for an inventive alignment method employed in the apparatus of FIG. 1.
Figure 6:
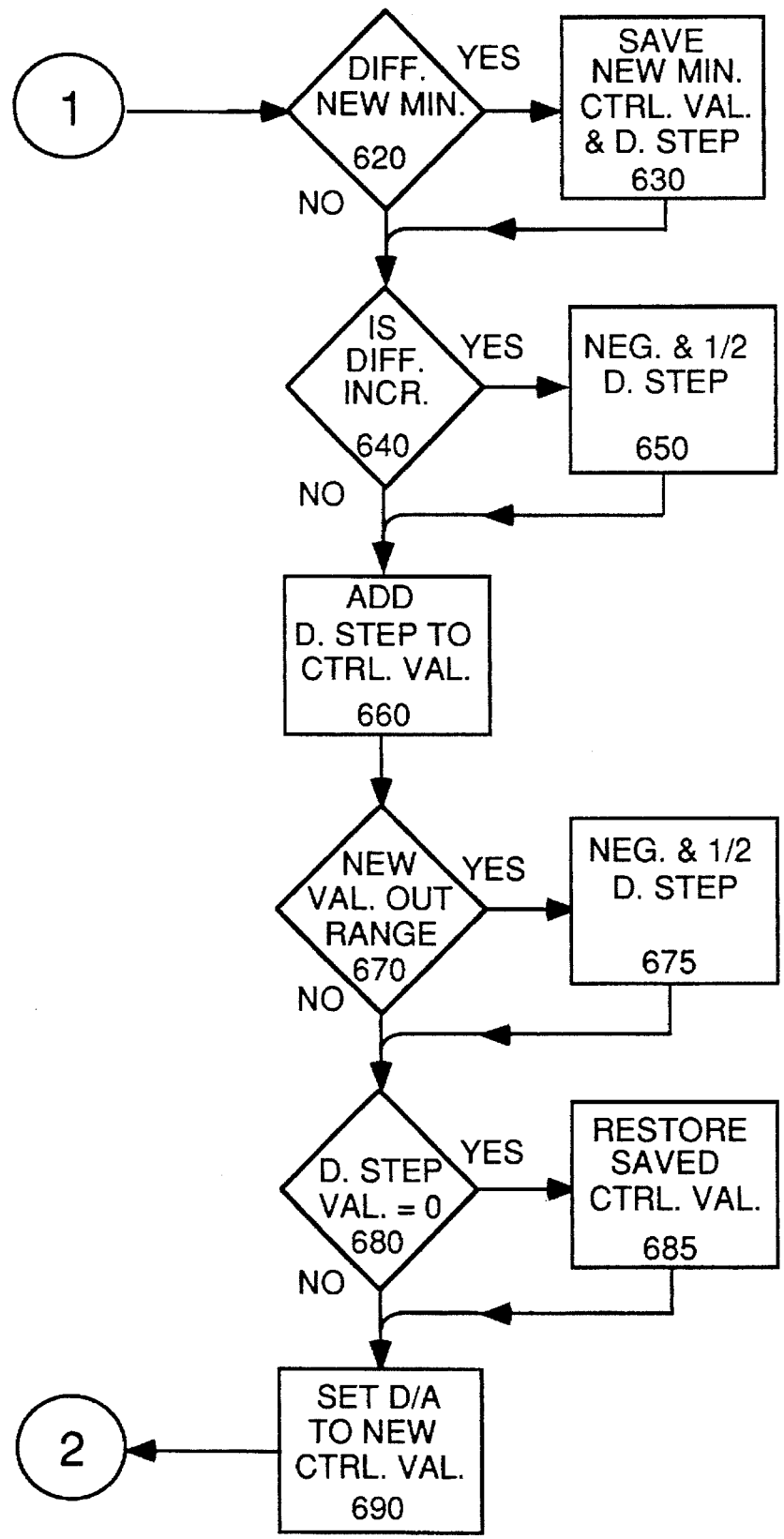

FIGS. 5 and 6 form a flow chart illustrating various functions to be performed, for example by alignment apparatus 800, to set the free run frequency of oscillator 112 of IC 100. The alignment algorithm is initiated at the element marked START. Oscillator 112 is allowed to free run at element 510, for example by disconnecting the synchronization signal at SEL 104 of IC 100. At element 520, various initial setting are established. For example, a large but finite number representing a frequency difference value is stored at a memory location, also an analog to digital converter digital control word is set to a mid range control value and a control step change, or delta step, value is also initialized. For example, the analog to digital converter which controls the free run frequency of oscillator 112 has a control range of $2^5$ or 32 steps, thus the mid range value set at element 520 is 16. The initial delta step value is set to $2^3$ or 8. The mid range value is applied to D/A 109 at element 530, causing the oscillator frequency to change. The oscillator is allowed to stabilize or settle for approximately 100 milliseconds following the D/A value change, then at element 540 the average frequency is measured by the algorithm of FIG. 4. Having measured the average frequency, the frequency difference from a standard frequency value, for example the NTSC horizontal frequency of 15.734 KHz, is calculated and expressed as an absolute value at element 550. The absolute value of frequency difference is tested at element 560 for a value less than a predetermined minimum termination value, for example 50 Hz. If the result at element 560 is YES, then the alignment is completed at element 570. At element 580 oscillator 112 is resynchronized and the alignment is ended.

If element 560 tests NO, the control step delta or change value is tested for equality with zero at element 590. If element 590 tests YES, the delta value is zero, and although the frequency difference is greater than the termination value tested at element 560, the alignment is completed at 570 since the required delta or change value lies between zero and one control step change. If element 590 tests NO, the change value is not zero and the algorithm increments a loop counter at element 600. The counter counts the number of adjustment loops or tries performed by the algorithm, and provides a path by which the alignment is abandoned, most probably as a result of a fault condition. Since the control system has 32 possible values no more than 32 tries should be required to achieve an oscillator setup condition. However since the control value may reverse direction, or polarity fewer than 32 tries should be required. Thus, element 610 tests the counter for a value of greater than 20, with a YES resulting in an alignment failure at element 615. Upon alignment failure the oscillator is resynchronized at element 580 and the alignment is ended. Although the free running frequency of oscillator has not been successfully set, it is resynchronized to permit continued testing or failure analysis.

If element 610 tests NO, the algorithm commences a series of tests and measurements which cause free running frequency to be rapidly converged on the standard frequency value. Thus, a NO at element 610 results in the difference frequency value, determined at 550, being tested at element 620, to determine if the difference frequency represents a new minimum value, i.e. the difference is getting smaller. A YES at element 620 causes the new minimum difference, or frequency error, value to be stored at element 630, together with the control step value which created that new minimum. Following data storage at 630, or a NO at element 620, the minimum difference frequency is tested at element 640 to determine if difference frequency is increasing. This tests to determine if the oscillator is being driven towards a null, or on frequency condition, or away therefrom. Typically under this condition the oscillator frequency would be lower than the standard frequency, hence a YES at 640 will cause element 650 to reverse direction or polarity by negating the delta step value and then halving the delta step value. Thus element 640 effectively detects an overshoot condition with element 650 providing the required correction of direction to rapidly reach the null or on frequency condition. The negated and halved delta step value from element 650 is added to the current control value to produce a new control value at element 660. Similarly if element 640 determines that the difference frequency is not increasing, i.e. the control value has the required polarity for frequency convergence, then the existing delta step value is added, at element 660, to the current control value to produce a new control value. Thus the oscillator continues to be driven in the correct direction but with a control value increased by the delta step value.

The new control value is tested at element 670 to determine if the new value is within the control range of $2^5$ or 32 steps. If the new value is beyond the control range, element 670 tests YES and the delta step value is reversed in direction, or negated, and halved in value at element 675. Following element 675, or if element 670 tests NO, the algorithm continues to element 680 where the delta step value is tested for equality with zero. If element 680 tests YES, i.e. the delta is zero, the step value saved at 630 is restored and added to the control value at element 685. Following element 685 or if element 680 tests NO, the new control value is applied to the D/A at element 690, and the oscillator is allowed time to settle. Following element 690 the algorithm returns to element 540 which measures the average frequency resulting from the application of the new control value. Thus, the algorithm continues to repeat elements 540 through 690 until test 610 determines alignment failure, or tests 560 or 590 determine completed alignment.

The burst gate pulse component of the sandcastle pulse signal SC may be measured by an alternative algorithm for aligning the free run frequency to a standard frequency which is illustrated in FIG. 7. The algorithm is initiated at START and at element 710 the oscillator synchronization is removed allowing the oscillator to free run. At element 720, a control value is applied to the digital to analog converter which represents half the control range, or step 15 of a range of 0 to 31. The control value is generated by alignment computer 260 and communicated to D/A 109 as previously described. Element 730 allows time for the oscillator to assume the new frequency resulting from the application of the control value to the D/A. At element 740 the frequency is measured and an average frequency FAVE corresponding to the mid range value, is determined by the algorithm of FIG. 4. Since the burst gate pulse is not subject to the spurious phase modulation applied the CHD signal, the number of averaging samples M, in the algorithm of FIG. 4 is reduced to 8. Hence the time required to establish an average value is reduced from 33 milliseconds to approximately 0.5 milliseconds. At element 750, the average frequency FAVE is tested for a value within a range of frequencies about the desired standard frequency FSTD. If element 750 tests YES, the alignment is indicated complete at element 790, the oscillator is resynchronized at element 795 and the alignment is ended. If element 750 tests NO, a loop counter is incremented at element 760. At element 770, the count is tested for equality with the numerical value of N, where N has a value is slightly greater than half the total number of control steps. Since the algorithm commences at a mid range control value, alignment should be achieved within a maximum number of tries which is less than half the numerical value of the range of control. Hence, if element 770 tests YES, the alignment has failed, probably due to circuit failure and the alignment is incomplete as indicated at element 777. The oscillator synchronization is restored at element 795, and the alignment is ended.

If element 770 tests NO, the initial control increment value which represents half the total control range, is halved at element 775. A calculation is performed at element 780, to determine if the new control increment produced at 775 is to be added or subtracted from the current control value such as to change the oscillator frequency towards that of the standard frequency. The changed control value is applied to the D/A at element 720. Thus, the algorithm now repeats elements 720–780 until either termination requirement 750 or 770 is satisfied. With each loop of elements 720–780 the control signal increment is halved which results in a damped oscillatory approach to the desired free running frequency. However, since the measured signal, for example the burst gate pulse, is not phase modulated, the average frequency may be determined in a shorter period than that required by the algorithm of FIGS. 5 and 6. Hence, although the correct frequency value is determined by successive approximations, which may require multiple adjustment cycles, the overall time taken may be less than that of the algorithm shown in FIGS. 5 and 6. The presence or absence of burst gate pulses during the vertical period, 9H, may be accommodated by various techniques. For example, counter 270 may be gated with a suitable 9H vertical rate pulse to inhibit counting. An alternative solution is to modify the standard frequency FSTD to that of a standard burst gate pulse signal.

Another method of setting the oscillator free running frequency by measurement of the burst gate pulse component of the sandcastle pulse is shown in the flow chart illustrated in FIG. 8. The algorithm is commenced at START and at element 810 the oscillator is caused to free run. At element 820 the D/A converter is set to an end of range control value determined by computer 260 and communicated thereto as described previously. Settling time is provided at element 830, to allow the oscillator to assume the new frequency corresponding to the range end control value. At element 840 the average frequency FAVE of the burst gate component of the sandcastle pulse is measured as indicated in algorithm of FIG. 4. As described in the algorithm of FIG. 7, the frequency averaging is performed over approximately eight samples. The average frequency FAVE is tested for equality within a tolerance window about the standard frequency FSTD at element 850. A YES at element 850 indicates the oscillator frequency is set within tolerance of the standard frequency and the alignment is indicated as complete at element 890. At element 895 the oscillator is resynchronized and the alignment is ended.

If element 850 tests NO, a counter at element 860 is incremented, where the count indicates the number of adjustment attempts. The count is tested for equality to 31 at element 870, with YES indicating that 31 control value step changes have occurred without achieving the termination requirements of element 850. At element 875 the alignment is indicated to have failed and is incomplete. The oscillator is resynchronized at element 895, and the alignment ends.

If element 870 tests NO, the control value is changed by one control step, i.e. one LSB, at element 880 and the new control value is applied to D/A 109 at element 820. The algorithm repeats elements 820–880 until either of the termination requirements is satisfied. With each loop of elements 820–880 the control signal value is changed by one control value step, 1 LSB, which results in a linear approach to the correct free run frequency. As indicated previously since the burst gate pulse is stable, the average frequency may be measured in a short time period hence a simple but multiple cycle algorithm may be employed to achieve faster alignment than that of the algorithm shown in FIGS. 5 and 6.

What is claimed is:

1. A free running frequency alignment method in a video display having a sync generator comprising a first oscillator having a first frequency and a second oscillator having a second frequency, where a free running frequency of said first oscillator is to be controllably aligned to a standard frequency, an output of said first oscillator being modulated by said second oscillator having a free running frequency different from said standard frequency, said alignment method comprising the steps of:

(a) applying to said first oscillator a frequency determining control signal having a first value;
    (b) measuring, in accordance with modulation imposed by said second oscillator on said first oscillator output, said free running frequency of said first oscillator responsive to said control signal;
    (c) determining a difference in frequency between the measured frequency and said standard frequency and generating said control signal having a new value responsive to said difference; and
    (d) applying said control signal having said new value to said first oscillator for alignment with said standard frequency.

2. The method of claim 1, wherein said first value of step (a) has a value within a range of control.

3. The method of claim 2, wherein said value within a range of control is a mid control range value.

4. The method of claim 1, wherein said step (c) comprises testing said difference in frequency for a value within a range of frequencies representing an aligned condition and ending said alignment, for other frequency difference values continuing said alignment.

5. The method of claim 4, wherein for said other frequency difference values continuing said alignment and repeating said steps (a)–(d) until said frequency difference value is within said range of frequencies representing an aligned condition.

6. The method of claim 5, wherein said aligned condition being represented by frequencies of nominally 50 Hz or less.

7. The method of claim 1, wherein generation of said new value in said step (c), further comprises a step of testing said frequency difference for an increasing frequency value, where said increasing frequency value causes a last control value increment to be reversed in polarity and added to said first value, a decreasing frequency value causes said last control value increment to be added to said first value, a sum of said first value and said added value increment forming said new value.

8. The method of claim 7, wherein said increasing frequency value causes said last control value increment to be halved in value.

9. The method of claim 7, wherein said step (c) comprises an additional step of testing said new value for a value beyond a range of control.

10. The method of claim 9, wherein said additional step further comprises a step of reversing said polarity of said last control value increment and adding to said new value responsive to said new value being beyond said range of control.

11. The method of claim 4, whereupon continuing said alignment includes a further step of incrementing a counter.

12. The method of claim 11, additionally comprises a step of testing said counter for a count greater than a predetermined value where said greater count causes said alignment to be terminated, and where said count less than said predetermined value causes said alignment to continue.

13. The method of claim 10, wherein said additional step further comprises a step of testing said last control value increment for a zero value and thereupon terminating said alignment.

14. A free running frequency alignment method in a video display having a sync generator comprising a first oscillator having a first frequency and a second oscillator having a second frequency, where a free running frequency of said first oscillator is to be controllably aligned to a standard frequency, an output signal of said first oscillator comprising a first component representative of said first oscillator frequency and a second component that is subject to interference by said second oscillator having a free running frequency different from said standard frequency, said alignment method comprising the steps of:

(a) processing said first oscillator output signal to produce a processed signal representative of said first component;

(b) measuring a frequency of said processed signal; and (c) adjusting said first oscillator frequency to said standard frequency in accordance with said measured frequency.

15. The method of claim 14, wherein said step (b) further comprises calculating a frequency difference between said measured frequency and said standard frequency.

16. The method of claim 15, wherein said step (b) additionally comprises measuring said frequency difference to determine a value within a range of frequencies representing an aligned condition and terminating alignment thereupon.

17. The method of claim 16, wherein said step (b) additionally comprises repeating said steps (a)–(c) for frequency difference values beyond said range, until said frequency difference value is within said range of frequencies representing an aligned condition.

18. A frequency alignment method in a video display having a sync generator comprising a first oscillator having a first frequency and a second oscillator having a second frequency, where a free running frequency of said first oscillator is to be controllably aligned to a standard frequency, an output signal of said first oscillator comprising a first component representative of said first oscillator frequency and a second component that is subject to interference by said second oscillator having a free running frequency different from said standard frequency, said alignment method comprising the steps of:

(a) applying a frequency determining control value to said first oscillator, said control value having a control range limit value;

(b) measuring a frequency of said first oscillator; and, (c) determining a frequency difference value between said measured frequency and said standard frequency, and terminating alignment for said difference value within a range of frequencies representing an aligned condition, and for said difference value beyond said range, changing said frequency determining control value by one increment and repeating said steps (a)–(c).

19. The frequency alignment method of claim 18, wherein said first component, representative of said first oscillator frequency, includes a burst gate pulse waveform.

20. The frequency alignment method of claim 18, wherein said second component, subject to interference, includes a blanking waveform.

* * * * *